US010223978B2

(12) United States Patent
Zen et al.

(10) Patent No.: US 10,223,978 B2
(45) Date of Patent: Mar. 5, 2019

(54) DISPLAY DEVICE, DISPLAY METHOD, AND PROGRAM (71) Applicant: Saturn Licensing LLC, New York, NY (US)

(72) Inventors: Masao Zen, Chiba (JP); Akihiro Ohta, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/405,953

(22) PCT Filed: Jun. 5, 2013

(86) PCT No.: PCT/JP2013/065618
§ 371 (c)(1),
(2) Date: Dec. 5, 2014

(87) PCT Pub. No.: WO2013/187296
PCT Pub. Date: Dec. 19, 2013

(65) Prior Publication Data
US 2015/0187285 A1 Jul. 2, 2015

(30) Foreign Application Priority Data

Jun. 14, 2012 (JP) ................. 2012-134480

(51) Int. Cl.
G09G 3/34 (2006.01)
G09G 3/36 (2006.01)
H04N 3/12 (2006.01)

(52) U.S. Cl.
CPC ......... *G09G 3/3406* (2013.01); *G09G 3/3611* (2013.01); *H04N 3/127* (2013.01);
(Continued)

(58) Field of Classification Search
CPC ........... G09G 3/3406; G09G 2310/024; G09G 2320/0252; G09G 3/342; G09G 2310/08;
(Continued)

(56) References Cited

U.S. PATENT DOCUMENTS 6,965,367 B2 11/2005 Tanaka et al.
7,113,164 B1 9/2006 Kurihara
(Continued)

FOREIGN PATENT DOCUMENTS

CN 1174362 C 11/2004
CN 101317209 A 12/2008
(Continued)

OTHER PUBLICATIONS

Extended European Search Report for EP Application 13805199.0, dated Oct. 1, 2015.
(Continued)

*Primary Examiner* — Sanjiv D. Patel
(74) *Attorney, Agent, or Firm* — Lerner, David, Littenberg, Krumholz & Mentlik, LLP (57) ABSTRACT Provided is a display device including a first change unit configured to change a transmittance of a liquid crystal panel in synchronization with a first timing, a second change unit configured to change brightness of a backlight of the liquid crystal panel in synchronization with a second timing, a calculation unit configured to calculate delay time for delaying the second timing relative to the first timing, and a delay control unit configured to make the first change unit change the transmittance of the liquid crystal panel in synchronization with the first timing, and make the second change unit change the brightness of the backlight in synchronization with the second timing delayed from the first timing by the delay time.

12 Claims, 6 Drawing Sheets (52) U.S. Cl.
CPC . *G09G 2310/08* (2013.01); *G09G 2320/0252* (2013.01); *G09G 2320/041* (2013.01); *G09G 2360/16* (2013.01)

(58) Field of Classification Search
CPC .......... G09G 2320/06; G09G 2320/02; G09G 2320/066; G09G 3/3426; G09G 2320/0646; G09G 2360/16; G09G 2320/064; G09G 2310/0237; G09G 2320/041; G02F 2001/133601
USPC ......................................................... 345/102
See application file for complete search history.

(56) References Cited

U.S. PATENT DOCUMENTS

| | | | | |
|---|---|---|---|---|
| 2004/0012551 | A1* | 1/2004 | Ishii | G09G 3/3406 345/87 |
| 2006/0290627 | A1* | 12/2006 | Konno | G02F 1/133606 345/87 |
| 2007/0057900 | A1* | 3/2007 | Huang | G09G 3/342 345/102 |
| 2007/0132709 | A1* | 6/2007 | Kawaguchi | G09G 3/3406 345/102 |
| 2008/0018587 | A1* | 1/2008 | Honbo | G09G 3/3406 345/102 |
| 2008/0074060 | A1* | 3/2008 | Ye | H05B 33/0815 315/307 |
| 2009/0015602 | A1* | 1/2009 | Rumreich | G09G 3/3406 345/690 |
| 2010/0295879 | A1* | 11/2010 | Tanaka | G09G 3/3426 345/690 |
| 2011/0193888 | A1* | 8/2011 | Yamato | G09G 3/342 345/690 |
| 2012/0044224 | A1* | 2/2012 | Michisaka | G09G 3/3426 345/207 |
| 2012/0105606 | A1* | 5/2012 | Kim | G09G 3/342 348/51 |
| 2012/0218175 | A1* | 8/2012 | Uemura | G09G 3/3406 345/102 |
| 2012/0274875 | A1* | 11/2012 | Sakita | G09G 3/3426 349/62 |
| 2013/0093803 | A1* | 4/2013 | Saitoh | G09G 3/3611 345/690 |
| 2013/0120481 | A1* | 5/2013 | Murai | G09G 3/3406 345/690 |
| 2013/0127699 | A1* | 5/2013 | Atkinson | G02F 1/1336 345/101 |

FOREIGN PATENT DOCUMENTS

| | | |
|---|---|---|
| CN | 101894532 A | 11/2010 |
| EP | 1253577 A1 | 10/2002 |
| JP | 2001-134226 A | 5/2001 |
| JP | 2002-366124 A | 12/2002 |
| JP | 2003-255914 A | 9/2003 |
| JP | 2005-345552 A | 12/2005 |
| JP | 2008-249876 A | 10/2008 |
| JP | 2009037000 A | 2/2009 |
| JP | 2009134237 A | 6/2009 |
| JP | 2009204825 | 9/2009 |
| JP | 2010-128445 A | 6/2010 |
| JP | 2010271393 A | 12/2010 |
| JP | 2011099953 A | 5/2011 |
| JP | 2011197510 A | 10/2011 |
| WO | 2009044828 A1 | 4/2009 |

OTHER PUBLICATIONS

International Search Report from International Publication PCT/JP2013/065618 dated Sep. 10, 2013.
Chinese Office Action for Application No. 201380029880.9 dated Sep. 5, 2016.
European Office Action for Application No. 13805199.0 dated Feb. 1, 2017.
Japanese Office Action for Application No. 2014-521284 dated Jan. 25, 2017.
Written Opinion for PCT/JP2013/065618 dated Sep. 10, 2013.
International Preliminary Report on Patentability for PCT/JP2013/065618 dated Sep. 10, 2013.
Chinese Search Report for Application No. 20130029880.9 dated Aug. 28, 2017, 2 pages.
Japanese Office Action for Application No. 2014-521284, dated Jun. 6, 2017.
Japanese Office Action for Application No. JP2014521284 dated Oct. 4, 2017.

* cited by examiner

DISPLAY DEVICE, DISPLAY METHOD, AND PROGRAM

CROSS-REFERENCE TO RELATED APPLICATION

The present application is a national phase entry under 35 U.S.C. § 371 of International Application No. PCT/JP2013/065618 filed Jun. 5, 2013, published on Dec. 19, 2013 as WO 2013/187296 A1, which claims priority from Japanese Patent Application No. JP 2012-134480, filed in the Japanese Patent Office on Jun. 14, 2012.

TECHNICAL FIELD

The present disclosure relates to a display device, a display method, and a program, and in particular, relates to a display device, a display method, and a program with which visual discomfort, which occurs when a transmittance of a liquid crystal panel is changed, can be prevented, for instance.

BACKGROUND ART

Conventionally, there exists a display device including a liquid crystal panel capable of changing a transmittance of light from a backlight.

The display device controls the liquid crystal panel and the backlight, and changes the transmittance of the liquid crystal panel and brightness of the backlight at the same timing in response to input image signals.

Also, for instance, the display device is capable of executing partial drive, in which the backlight is separately driven at a bright part and a dark part of an image (see Patent Literature 1, for instance).

The partial drive can cause the display device to, for instance, put out the backlight at the relatively dark part of the image or the like, thereby improving contrast of the image.

The backlight at the dark part of the image is lighted in the state where the transmittance of the corresponding liquid crystal panel is sufficiently lowered at the end of the partial drive, for instance.

CITATION LIST

Patent Literature

Patent Literature 1: JP 2010-128445A

SUMMARY OF INVENTION

Technical Problem

Incidentally, for instance, in such cases as where a response speed, which represents a changing speed of the transmittance of the liquid crystal panel, is relatively slow, and where a change amount when the transmittance of the liquid crystal panel is to be changed is large since the brightness of the image largely changes, the transmittance of the liquid crystal panel cannot be promptly changed.

Therefore, in a conventional display device, the transmittance of the liquid crystal panel and the brightness of the backlight may not be changed at the same timing, and visual discomfort is given to a person viewing the image output from the liquid crystal panel.

In particular, for instance, at the end of the above-described partial drive, the backlight at the dark part of the image may be lighted before the transmittance of the liquid crystal panel is sufficiently lowered.

In this case, it appears that the liquid crystal panel has flashed only for a moment, and visual discomfort is given to a person viewing the image output from the liquid crystal panel.

The present disclosure is implemented in consideration of such a situation, and is to prevent the visual discomfort which occurs when the transmittance of the liquid crystal panel is changed.

Solution to Problem

A display device according to an aspect of the present disclosure is a display device including a first change unit configured to change a transmittance of a liquid crystal panel in synchronization with a first timing, a second change unit configured to change brightness of a backlight of the liquid crystal panel in synchronization with a second timing, a calculation unit configured to calculate delay time for delaying the second timing relative to the first timing, and a delay control unit configured to make the first change unit change the transmittance of the liquid crystal panel in synchronization with the first timing, and make the second change unit change the brightness of the backlight in synchronization with the second timing delayed from the first timing by the delay time.

In the calculation unit, it is possible to calculate the delay time on the basis of at least one of a response speed of the liquid crystal panel and a change amount of the transmittance of the liquid crystal panel A response speed calculation unit configured to calculate the response speed of the liquid crystal panel can be further provided.

A temperature measurement unit configured to measure a temperature of the liquid crystal panel can be further provided, and in the response speed calculation unit, it is possible to calculate the response speed of the liquid crystal panel on the basis of the measured temperature of the liquid crystal panel.

A change amount calculation unit configured to calculate the change amount of the transmittance of the liquid crystal panel can be further provided.

A brightness measurement unit configured to measure, on the basis of an input image signal, brightness information related to brightness of an image indicated by the image signal can be further provided, and in the change amount calculation unit, it is possible to calculate the change amount on the basis of the brightness information.

A display method according to an aspect of the present disclosure is a display method for a display device including a first change unit configured to change a transmittance of a liquid crystal panel in synchronization with a first timing, and a second change unit configured to change brightness of a backlight of the liquid crystal panel in synchronization with a second timing, the display method including, performed by the display device, a calculation step of calculating delay time for delaying the second timing relative to the first timing, and a delay control step of making the first change unit change the transmittance of the liquid crystal panel in synchronization with the first timing, and making the second change unit change the brightness of the backlight in synchronization with the second timing delayed from the first timing by the delay time.

A program according to an aspect of the present disclosure is a program for causing a computer of a display device including a first change unit configured to change a transmittance of a liquid crystal panel in synchronization with a first timing, and a second change unit configured to change brightness of a backlight of the liquid crystal panel in synchronization with a second timing, to function as a calculation unit configured to calculate delay time for delaying the second timing relative to the first timing, and a delay control unit configured to make the first change unit change the transmittance of the liquid crystal panel in synchronization with the first timing, and make the second change unit change the brightness of the backlight in synchronization with the second timing delayed from the first timing by the delay time.

According to the present disclosure, the delay time for delaying the second timing relative to the first timing is calculated, the transmittance of the liquid crystal panel is changed by the first change unit in synchronization with the first timing, and the brightness of the backlight is changed by the second change unit in synchronization with the second timing delayed from the first timing by the delay time.

Advantageous Effects of Invention

According to the present disclosure, visual discomfort that occurs when the transmittance of the liquid crystal panel is changed can be prevented.

DESCRIPTION OF EMBODIMENTS

Hereinafter, an embodiment in the present disclosure (called the present embodiment, hereinafter) will be described. Descriptions will be given in the following order.

1. The present embodiment (one example when liquid crystal signals and backlight data are output at different timings)

2. Modification

<1. The Present Embodiment>

[Configuration Example of Television Receiver 1]

Figure 1:
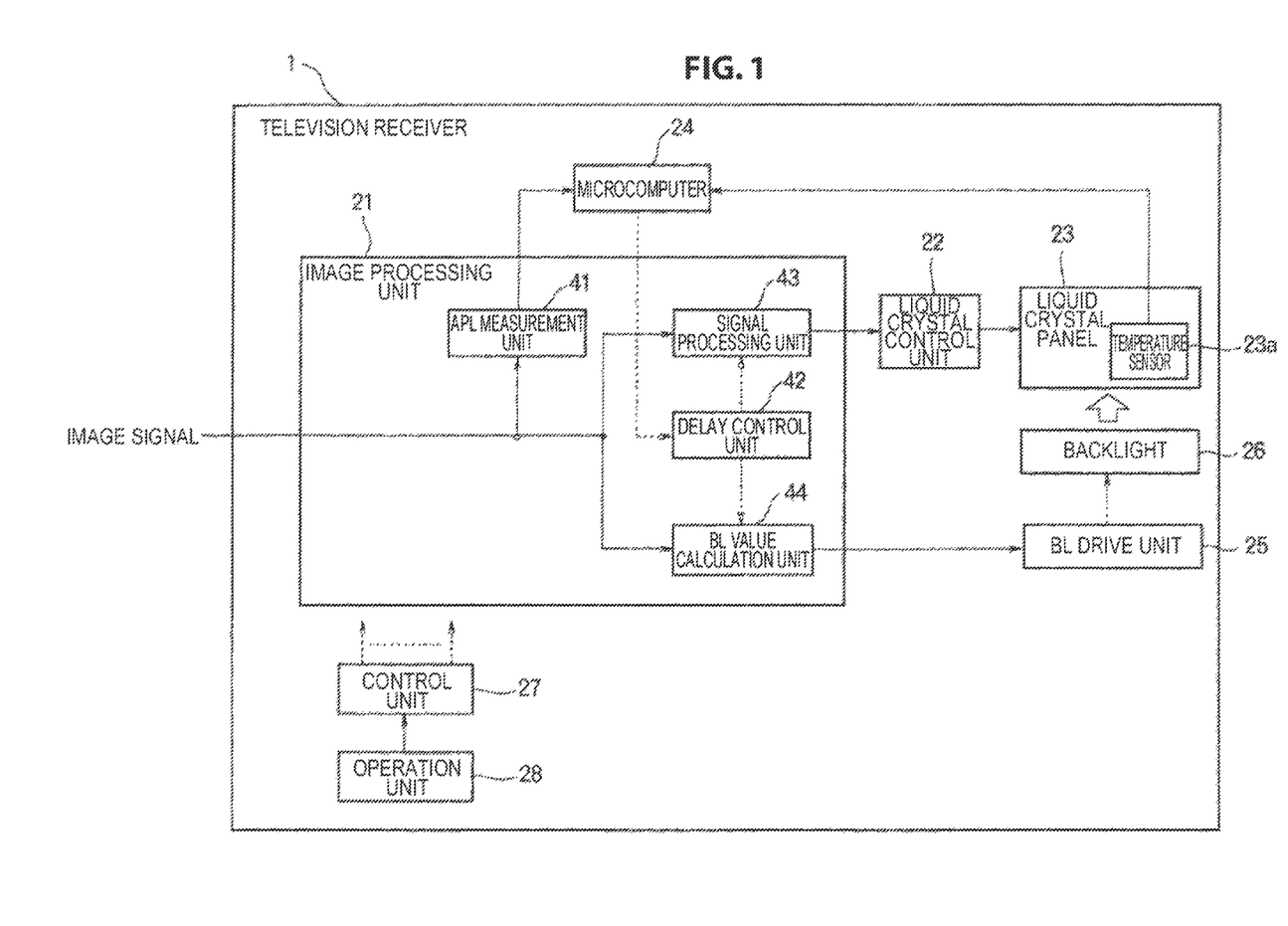
FIG. 1 is a block diagram illustrating a configuration example of a television receiver in the present disclosure.

FIG. 1 illustrates a configuration example of a television receiver 1 which is the present embodiment.

This television receiver 1 includes an image processing unit 21, a liquid crystal control unit 22, a liquid crystal panel 23 incorporating a temperature sensor 23a, a microcomputer (microcomputer) 24, a BL drive unit 25, a backlight 26, a control unit 27, and an operation unit 28.

In the television receiver 1, to the image processing unit 21, image signals as contents received from an antenna or the like not shown in the figure and image signals from a reproducing device or the like not shown in the figure are supplied.

The image processing unit 21 processes the supplied image signals, and includes an average picture level (APL) measurement unit 41, a delay control unit 42, a signal processing unit 43, and a BL value calculation unit 44.

The APL measurement unit 41 measures an APL, which represents an average of luminance for instance, as brightness information related to the brightness of an image indicated by the image signals on the basis of the supplied image signals.

Specifically, for instance, the APL measurement unit 41 measures the APL obtained by dividing a total sum of the luminance of individual pixels configuring the image by the number of the pixels of the image on the basis of the supplied image signals.

Then, the APL measurement unit 41 supplies the plurality of APLs measured for the respective supplied image signals to the microcomputer 24. Note that, the APL measurement unit 41 is capable of measuring the maximum luminance of the image, a distribution of the luminance of the image, the maximum luminance of individual areas configuring the image, and the like in addition to the APL, which represents the average of the luminance of the image, as the brightness information, and supplying the measurement results to the microcomputer 24 as the brightness information. However, in the present embodiment, descriptions will be given assuming that the APL measurement unit 41 measures the APL for the respective supplied image signals and supplies the measured APL to the microcomputer 24.

The delay control unit 42, according to an instruction from the microcomputer 24, makes liquid crystal signals be output from the signal processing unit 43 to the liquid crystal control unit 22 at a first timing, and makes backlight data be output from the BL value calculation unit 44 to the BL drive unit 25 at a second timing which arrives after the first timing.

The signal processing unit 43 calculates the distribution of the luminance of the image indicated by the image signals on the basis of the supplied image signals.

Also, the signal processing unit 43 generates the liquid crystal signals for changing the transmittance (aperture ratio) of the liquid crystal panel 23 to the transmittance according to the image signals on the basis of the calculated distribution of the luminance, and outputs them to the liquid crystal panel 23 at the first timing instructed from the delay control unit 42.

The transmittance of the liquid crystal panel 23 is determined for each of the individual pixels configuring the image as light output from the liquid crystal panel 23.

The BL value calculation unit 44 calculates the brightness (luminance) of the individual pixels configuring the image indicated by the image signals on the basis of the supplied image signals, and generates the backlight data for controlling the brightness of the backlight on the basis of the calculation result.

That is, for instance, in the case of partially driving the backlight, the BL value calculation unit 44 identifies a bright part and a dark part of the image on the basis of the calculated brightness of the individual pixels, and generates the backlight data for making the brightness of the backlight corresponding to the bright part be bright and making the brightness of the backlight corresponding to the dark part be dark.

Specifically, for instance, the BL value calculation unit 44 generates the backlight data for reducing a lighting amount of the backlight corresponding to an area of low luminance (dark part) and increasing the lighting amount of the backlight corresponding to an area of high luminance (bright part) in the entire area configuring the image.

Then, the BL value calculation unit 44 outputs the generated backlight data to the BL drive unit 25 at the second timing instructed from the delay control unit 42.

The liquid crystal control unit 22 changes the transmittance of the liquid crystal panel 23 on the basis of the liquid crystal signals from the signal processing unit 43, in synchronization with the first timing at which the liquid crystal signals are supplied from the signal processing unit 43, by controlling the liquid crystal panel 23.

In the television receiver 1 in FIG. 1, between the signal processing unit 43 and the liquid crystal control unit 22, a processing block for signal-processing the liquid crystal signals output from the signal processing unit 43 may be provided.

In this case, the signal processing unit 43 outputs the generated liquid crystal signals to the processing block at a timing for which processing time in the processing block is taken into consideration (the timing earlier than the first timing by the processing time in the processing block).

Thus, the liquid crystal signals processed in the processing block are supplied from the processing block to the liquid crystal control unit 22 at the first timing. Then, the liquid crystal control unit 22 changes the transmittance of the liquid crystal panel 23 in synchronization with the first timing as described above.

The liquid crystal panel 23 outputs transmitted light as the image by transmitting the light from the backlight 26 with the transmittance changed by the liquid crystal control unit 22.

Also, the temperature sensor 23a is provided inside the liquid crystal panel 23, measures a temperature inside the liquid crystal panel 23, and supplies the measurement result to the microcomputer 24.

The microcomputer 24 calculates a response speed of the liquid crystal panel 23 on the basis of the measurement result of measuring the temperature inside the liquid crystal panel 23, which is supplied from the temperature sensor 23a. Here, the response speed indicates the speed when the transmittance of the liquid crystal panel 23 is changed.

Also, the microcomputer 24 detects a change in the brightness of the image output from the liquid crystal panel 23, on the basis of the measurement result of measuring the APL of the image, which is supplied from the APL measurement unit 41 of the image processing unit 21.

That is, for instance, the microcomputer 24 detects whether the luminance of the image is to be changed from the low luminance to the high luminance or to be changed from intermediate luminance to the high luminance or the like, on the basis of the measurement result from the APL measurement unit 41 of the image processing unit 21.

Further, the microcomputer 24 calculates a change amount when the transmittance of the liquid crystal panel 23 is changed to the transmittance according to the image signals, on the basis of the detected change in the brightness of the image.

Also, the microcomputer 24 calculates the delay time for delaying the second timing of outputting the backlight data relative to the first timing of outputting the liquid crystal signals on the basis of the calculated response speed and change amount.

Then, the microcomputer 24 controls the delay control unit 42 so that the liquid crystal signals are output from the signal processing unit 43 at the first timing and the backlight data is output from the BL value calculation unit 44 at the second timing delayed from the first timing by the delay time.

The BL drive unit 25 changes the brightness of the backlight 26 in synchronization with the second timing at which the backlight data is supplied from the BL value calculation unit 44. That is, for instance, the BL drive unit 25 drives the backlight 26 in synchronization with the second timing, and makes the backlight 26 irradiate a back surface of the liquid crystal panel 23 with the light of the brightness according to the backlight data from the BL value calculation unit 44.

The backlight 26 is composed of a light emitting diode (LED) or the like for instance, and is provided on the back surface (a back side of a surface where the image is displayed) of the liquid crystal panel 23.

Also, the backlight 26 is driven by control from the BL drive unit 25, and is lighted by the lighting amount according to the backlight data supplied from the BL value calculation unit 44 to the BL drive unit 25. Thus, the back surface of the liquid crystal panel 23 is irradiated with the light from the backlight 26.

The control unit 27 controls the image processing unit 21, the liquid crystal control unit 22, the microcomputer 24, and the BL drive unit 25 corresponding to operation signals from the operation unit 28, for instance.

That is, for instance, in the case where a user performs instructing operation for instructing the partial drive using the operation unit 28, the control unit 27 controls to perform the partial drive corresponding to the operation signals from the operation unit 28 according to the instructing operation of the user.

Specifically, for instance, the control unit 27 makes the partial drive be performed by generating a partial drive control pulse indicating a timing of turning on the partial drive corresponding to the operation signals from the operation unit 28 and supplying it to the microcomputer 24. Note that, the control unit 27 ends the partial drive by generating the other partial drive control pulse indicating a timing of turning off the partial drive and supplying it to the microcomputer 24, similarly when ending the partial drive.

The operation unit 28 is, for instance, an operation button or the like, and is operated by the user. The operation unit 28 supplies the operation signals according to user's operation to the control unit 27 according to the operation from the user.

[One Example of Calculation Method of Response Speed]

Figure 2:
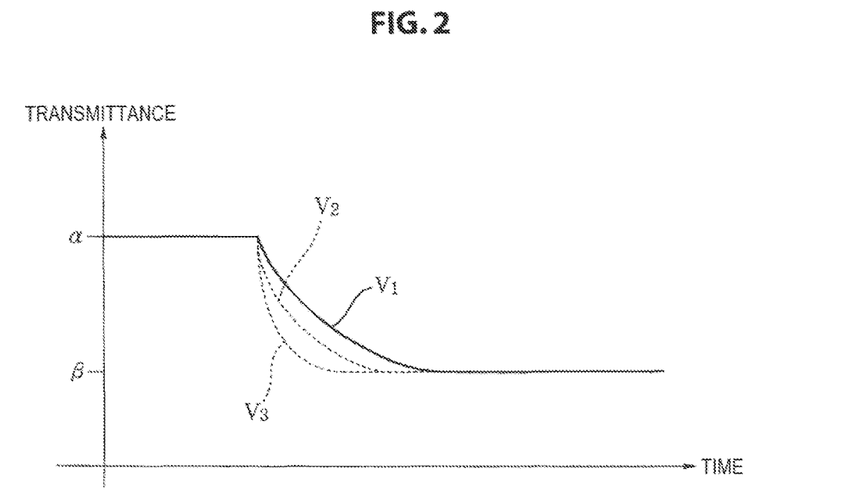
FIG. 2 is a diagram illustrating one example when a microcomputer calculates a response speed of a liquid crystal panel.

Next, FIG. 2 illustrates one example when the microcomputer 24 calculates the response speed of the liquid crystal panel 23 on the basis of the measurement result from the temperature sensor 23a.

In FIG. 2, a horizontal axis indicates time, and a vertical axis indicates the transmittance of the liquid crystal of the liquid crystal panel 23.

In FIG. 2, the response speeds V1 to V3 when the transmittance is changed from $\alpha$ to $\beta$ ($<\alpha$) are illustrated.

Generally, as the temperature inside the liquid crystal panel 23 rises, the response speed becomes high. Therefore, for instance, in the case where the response speed of the liquid crystal panel 23 is V1, when the temperature inside the liquid crystal panel 23 rises, the response speed changes from V1 to V2. Also, for instance, in the state where the response speed of the liquid crystal panel 23 has become V2, when the temperature inside the liquid crystal panel 23 rises further, the response speed changes from V2 to V3.

The microcomputer 24 holds, for instance, a table in which the temperature inside the liquid crystal panel 23 and the response speed of the liquid crystal panel 23 are made to correspond, beforehand. Then, the microcomputer 24 performs calculation by reading the response speed which is made to correspond to the temperature measured in the temperature sensor 23*a* from the table held beforehand, on the basis of the measurement result from the temperature sensor 23*a*.

The microcomputer 24 may hold a function indicating a relationship between the temperature inside the liquid crystal panel 23 and the response speed of the liquid crystal panel 23 beforehand. In this case, the microcomputer 24 calculates the response speed of the liquid crystal panel 23 by substituting the measurement result from the temperature sensor 23*a* for the function held beforehand as a variable.

Note that, the table and the function held beforehand in the microcomputer 24 are generated on the basis of results of experiments conducted beforehand using the liquid crystal panel 23 or the like, and are held.

Figure 3:
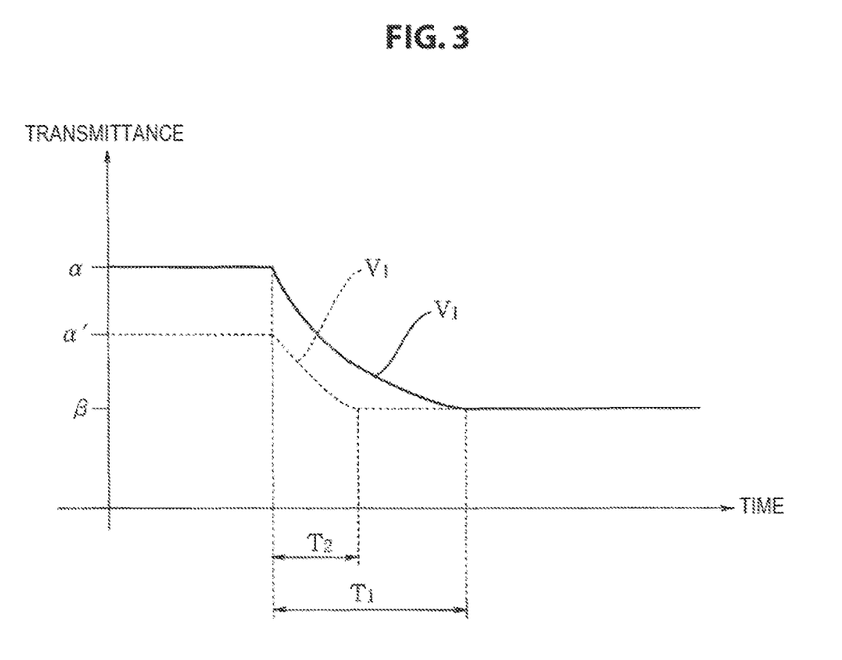
FIG. 3 is a diagram illustrating one example when the microcomputer calculates a change amount of the transmittance of the liquid crystal panel.

Next, FIG. 3 illustrates one example when the microcomputer 24 calculates the change amount of the transmittance of the liquid crystal panel 23 on the basis of the measurement result from the APL measurement unit 41.

For instance, in the case where the immediately preceding image output from the liquid crystal panel 23 is a bright image and the image to be output next is a dark image, as illustrated in FIG. 3, the transmittance of the liquid crystal panel 23 is changed from α to β at the response speed V1.

In this case, the microcomputer 24 calculates the change amount (α–β) of the transmittance on the basis of the measurement result from the APL measurement unit 41.

Then, the microcomputer 24 calculates delay time T1 on the basis of the response speed V1 calculated on the basis of the measurement result from the temperature sensor 23*a* and the change amount (α–β) calculated on the basis of the measurement result from the APL measurement unit 41.

The delay time T1 indicates the time until the transmittance of the liquid crystal panel 23 is changed from α to β at the response speed V1. Yet, the delay time T1 is not limited to this.

That is, for instance, the microcomputer 24 can calculate, instead of the delay time T1, the time T1″ (<T1) until the transmittance of the liquid crystal panel 23 is changed almost to β as the delay time. It is similar to delay time T2 described later.

Also, for instance, in the case where the immediately preceding image output from the liquid crystal panel 23 is the image of intermediate brightness and the image to be output next is the dark image, as illustrated in FIG. 3, the transmittance of the liquid crystal panel 23 is changed from α′ to β at the response speed V1.

In this case, the microcomputer 24 calculates the change amount (α′–β) of the transmittance on the basis of the measurement result from the APL measurement unit 41.

Then, the microcomputer 24 calculates delay time T2 (<T1) on the basis of the response speed V1 calculated on the basis of the measurement result from the temperature sensor 23*a* and the change amount (α′–β) calculated on the basis of the measurement result from the APL measurement unit 41.

The delay time T2 indicates the time until the transmittance of the liquid crystal panel 23 is changed from α′ to β at the response speed V1.

Figure 4:
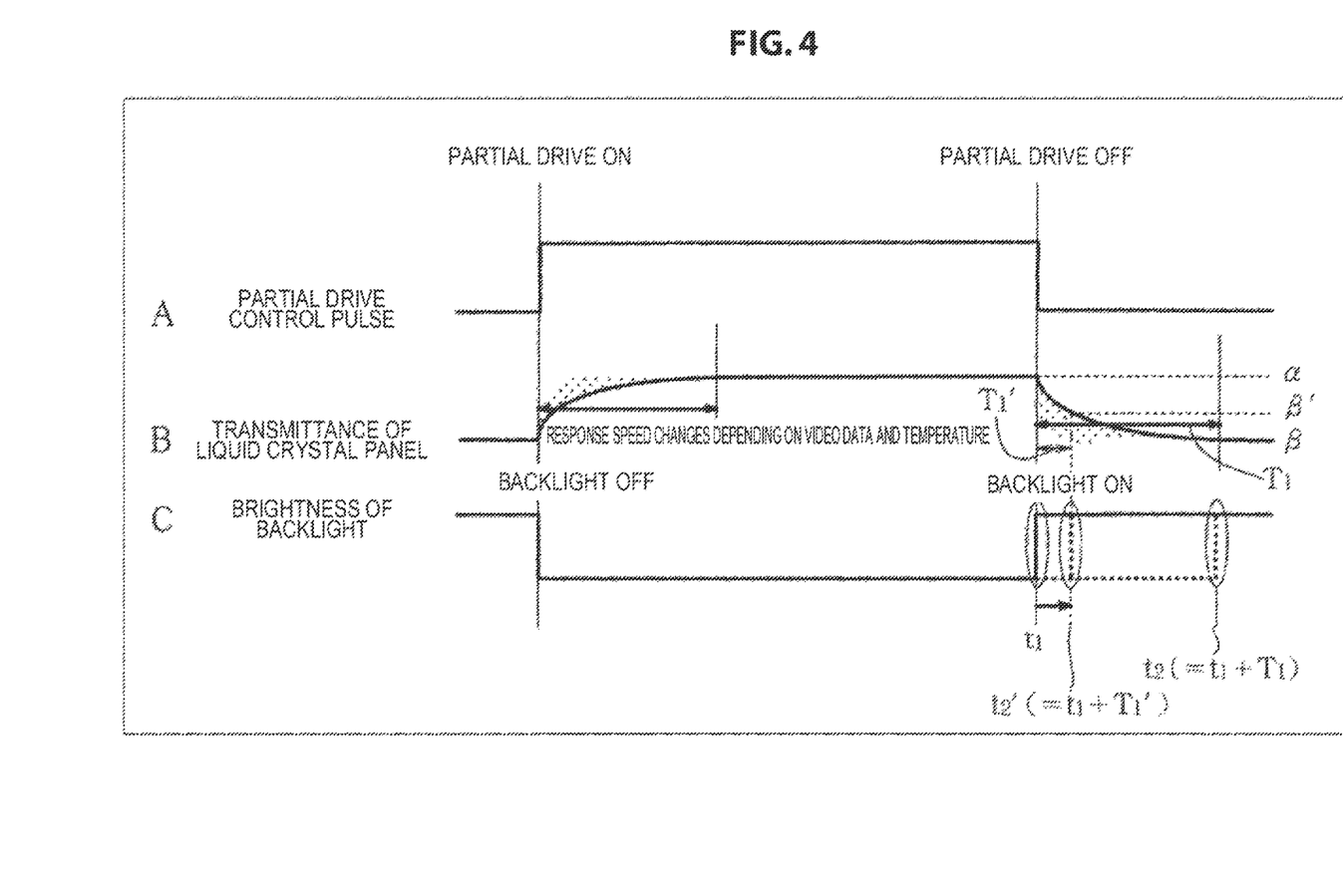
FIG. 4 is a diagram illustrating one example when the microcomputer determines first and second timings on the basis of calculated delay time.

Next, FIG. 4 illustrates one example when the microcomputer 24 determines the first timing and the second timing on the basis of the calculated delay time.

A in FIG. 4 illustrates one example of the partial drive control pulse output from the control unit 27. The partial drive control pulse is turned on when the partial drive is started, and is turned off when the partial drive is ended.

B in FIG. 4 illustrates the transmittance of the liquid crystal panel 23.

C in FIG. 4 illustrates the brightness of the backlight 26.

In the case where the delay time T1 as illustrated in B in FIG. 4 is calculated, the microcomputer 24 determines the first timing of outputting the liquid crystal signals and the second timing of outputting the backlight data on the basis of the calculated delay time T1.

In this case, the microcomputer 24 determines a timing t1 of turning off the partial drive control pulse illustrated in A in FIG. 4 as the first timing and a timing t2 (=t1+T1) delayed from the first timing by the delay time T1 as the second timing, for instance.

Then, the microcomputer 24 controls the delay control unit 42, makes the liquid crystal signals be output from the signal processing unit 43 at the first timing t1, and makes the backlight data be output from the BL value calculation unit 44 at the second timing t2.

Also, for instance, the microcomputer 24 may calculate the time until the transmittance α at the timing t1 becomes a transmittance β′ close to the transmittance β as delay time T1′, instead of the delay time T1.

In this case, the microcomputer 24 determines, for instance, the timing t1 as the first timing and a timing t2′ (=t1+T1′) delayed from the first timing by the delay time T1′ as the second timing. Then, the microcomputer 24 controls the delay control unit 42, makes the liquid crystal signals be output from the signal processing unit 43 at the first timing t1, and makes the backlight data be output from the BL value calculation unit 44 at the second timing t2′.

In the microcomputer 24, the first timing and the second timing are not limited to the case illustrated in FIG. 4, and when the second timing is delayed from the first timing by the delay time, any timings may be the first timing and the second timing.

That is, for instance, the microcomputer 24 can define the first timing as the timing before or after the timing t1, and can define the first timing and the second timing as the timings before the timing t1, respectively.

Also, while the case of turning off the partial drive is described in FIG. 4, the microcomputer 24 can determine the first and second timings similarly in the case of turning on the partial drive.

That is, in the case where the partial drive is turned on in FIG. 4, the microcomputer 24, for instance, calculates the time until the transmittance of the liquid crystal panel 23 is changed from β to α as the delay time, and determines the first and second timings on the basis of the calculated delay time.

Determination of the first and second timings by the microcomputer 24 as described above is not limited to the case where the partial drive is turned on or off. That is, in the case where the transmittance of the liquid crystal panel 23 is to be changed, the microcomputer 24 can determine the first and second timings as described above in any case.

[Operation Description of Television Receiver 1]

Figure 5:
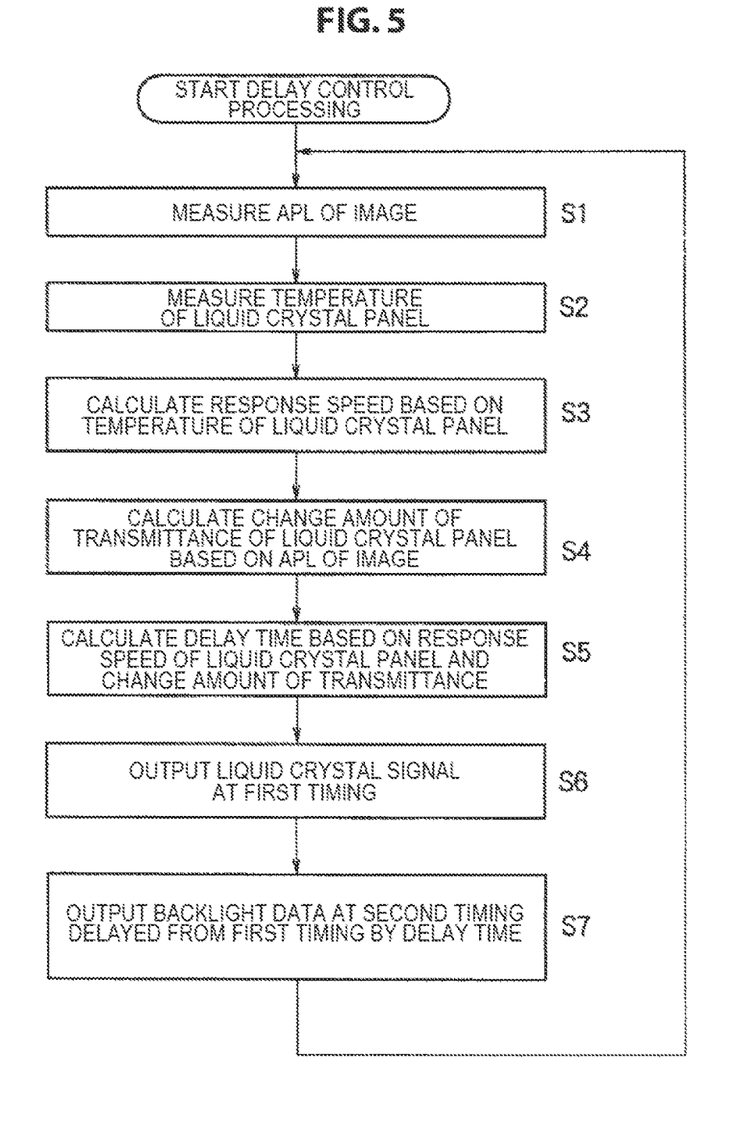
FIG. 5 is a flowchart for illustrating delay control processing performed by the television receiver.

Next, with reference to a flowchart in FIG. 5, delay control processing performed by the television receiver 1 will be described.

The delay control processing is started when a power source of the television receiver 1 is turned on, for instance. At this time, to the image processing unit 21, for instance, the image signals received by an antenna not shown in the figure are input.

In step S1, the APL measurement unit 41 of the image processing unit 21 measures the APL of the image indicated by the image signals on the basis of the supplied image signals, and supplies the measurement result to the microcomputer 24.

In step S2, the temperature sensor 23a measures the temperature inside the liquid crystal panel 23, and supplies the measurement result to the microcomputer 24.

In step S3, the microcomputer 24 calculates the response speed of the liquid crystal panel 23 on the basis the measurement result supplied from the temperature sensor 23a.

In step S4, the microcomputer 24 calculates the change amount when the transmittance of the liquid crystal panel 23 is changed to the transmittance corresponding to the image signals on the basis of the measurement result from the APL measurement unit 41.

In step S5, the microcomputer 24 calculates the delay time for delaying the second timing relative to the first timing, on the basis of the response speed of the liquid crystal panel 23 and the change amount of the liquid crystal panel 23, which are calculated.

Then, the microcomputer 24 controls the delay control unit 42 so that the liquid crystal signals are output from the signal processing unit 43 at the first timing and the backlight data is output from the BL value calculation unit 44 at the second timing delayed from the first timing by the delay time.

In step S6, the delay control unit 42 controls the signal processing unit 43 according to the instruction from the microcomputer 24, and makes the liquid crystal signals be output to the liquid crystal control unit 22 at the first timing.

Thus, the liquid crystal control unit 22 changes the transmittance of the liquid crystal panel 23 to the transmittance according to the liquid crystal signals from the signal processing unit 42, by controlling the liquid crystal panel 23 in synchronization with the first timing at which the liquid crystal signals are supplied from the signal processing unit 42.

In step S7, the delay control unit 42 controls the BL value calculation unit 44 according to the instruction from the microcomputer 24, and makes the backlight data be output to the BL drive unit 25 at the second timing delayed from the first timing by the delay time.

Thus, the BL drive unit 25 drives the backlight 26 in synchronization with the second timing at which the backlight data is supplied from the BL value calculation unit 44, and changes the brightness of the backlight 26 to the brightness according to the backlight data from the BL value calculation unit 44.

Then, corresponding to the fact that the next image signal is input to the image processing unit 21, processing returns from step S7 to step S1, and the similar processing is performed thereafter. The delay control processing is ended, for instance, when the power source of the television receiver 1 is turned off.

As described above, by the delay control processing, the microcomputer 24 determines the first and second timings on the basis of the response speed that changes according to the temperature inside the liquid crystal panel 23 and the change amount of the transmittance that changes according to the brightness of the individual images.

Then, the delay control unit 42 makes the liquid crystal signals be output from the signal processing unit 43 to the liquid crystal control unit 22 at the first timing, and makes the backlight data be output from the BL value calculation unit 44 to the BL drive unit 25 at the second timing delayed from the first timing by the delay time.

Therefore, for instance, the brightness of the backlight 26 can be changed to the brightness according to the image signals at a timing at which the transmittance of the liquid crystal panel 23 becomes the transmittance according to the image signals.

Therefore, by the delay control processing, it is made possible to prevent the situation of giving visual discomfort to the user regardless of the change in the response speed of the liquid crystal panel 23 and the brightness of the image.

<2. Modification>

In the present embodiment, the microcomputer 24 calculates the delay time on the basis of the response speed of the liquid crystal panel 23 calculated on the basis of the measurement result from the temperature sensor 23a and the change amount of the transmittance of the liquid crystal panel 23 calculated on the basis of the measurement result from the APL measurement unit 41.

However, the microcomputer 24 may calculate the delay time on the basis of one of the response speed of the liquid crystal panel 23 and the change amount of the transmittance of the liquid crystal panel 23.

That is, for instance, the microcomputer 24 calculates the delay time on the basis of the response speed of the liquid crystal panel 23 calculated on the basis of the measurement result from the temperature sensor 23a and an average change amount of the transmittance of the liquid crystal panel 23. It is assumed that the average change amount of the liquid crystal panel 23 is held beforehand in the microcomputer 24.

In this case, since the APL measurement unit 41 can be omitted, a configuration of the television receiver 1 can be simplified. Also, in the television receiver 1, since the processing of calculating the change amount of the transmittance of the liquid crystal panel 23 on the basis of the measurement result from the APL measurement unit 41 can be omitted, the delay time can be calculated more quickly.

Further, for instance, the microcomputer 24 calculates the delay time on the basis of the change amount of the transmittance of the liquid crystal panel 23 calculated on the basis of the measurement result from the APL measurement unit 41 and an average response speed of the liquid crystal panel 23. It is assumed that the average response speed of the liquid crystal panel 23 is held beforehand in the microcomputer 24.

In this case, since the temperature sensor 23a can be omitted, the configuration of the television receiver 1 can be simplified. Also, in the television receiver 1, since the processing of calculating the response speed of the liquid crystal panel 23 on the basis of the measurement result from the temperature sensor 23a can be omitted, the delay time can be calculated more quickly.

In the present embodiment, the television receiver 1 is described; however, the present technology is applicable to an electronic device such as a personal computer incorporating a display controller in addition to the display controller that controls the liquid crystal panel 23 and the backlight 26 and the television receiver 1.

Additionally, the present technology may also be configured as below.

(1) A display device including:

a first change unit configured to change a transmittance of a liquid crystal panel in synchronization with a first timing;

a second change unit configured to change brightness of a backlight of the liquid crystal panel in synchronization with a second timing;

a calculation unit configured to calculate delay time for delaying the second timing relative to the first timing; and a delay control unit configured to
  make the first change unit change the transmittance of the liquid crystal panel in synchronization with the first timing, and
  make the second change unit change the brightness of the backlight in synchronization with the second timing delayed from the first timing by the delay time.
(2) The display device according to (1),
  wherein the calculation unit calculates the delay time on the basis of at least one of a response speed of the liquid crystal panel and a change amount of the transmittance of the liquid crystal panel.
(3) The display device according to (2), further including:
  a response speed calculation unit configured to calculate the response speed of the liquid crystal panel.
(4) The display device according to (3), further including:
  a temperature measurement unit configured to measure a temperature of the liquid crystal panel,
  wherein the response speed calculation unit calculates the response speed of the liquid crystal panel on the basis of the measured temperature of the liquid crystal panel.
(5) The display device according to any one of (2) to (4), further including:
  a change amount calculation unit configured to calculate the change amount of the transmittance of the liquid crystal panel.
(6) The display device according to (5), further including:
  a brightness measurement unit configured to measure, on the basis of an input image signal, brightness information related to brightness of an image indicated by the image signal,
  wherein the change amount calculation unit calculates the change amount on the basis of the brightness information.
(7) A display method for a display device including
  a first change unit configured to change a transmittance of a liquid crystal panel in synchronization with a first timing, and
  a second change unit configured to change brightness of a backlight of the liquid crystal panel in synchronization with a second timing, the display method including, performed by the display device:
  a calculation step of calculating delay time for delaying the second timing relative to the first timing; and
  a delay control step of
  making the first change unit change the transmittance of the liquid crystal panel in synchronization with the first timing, and
  making the second change unit change the brightness of the backlight in synchronization with the second timing delayed from the first timing by the delay time.
(8) A program for causing a computer of a display device including
  a first change unit configured to change a transmittance of a liquid crystal panel in synchronization with a first timing, and
  a second change unit configured to change brightness of a backlight of the liquid crystal panel in synchronization with a second timing, to function as:
  a calculation unit configured to calculate delay time for delaying the second timing relative to the first timing; and
  a delay control unit configured to
  make the first change unit change the transmittance of the liquid crystal panel in synchronization with the first timing, and
  make the second change unit change the brightness of the backlight in synchronization with the second timing delayed from the first timing by the delay time.

The above mentioned series of processes can, for example, be executed by hardware, or can be executed by software. In the case where the series of processes is executed by software, a program configuring the software is installed from a medium recording the program into a computer incorporated in specialized hardware, or a general-purpose personal computer which is capable of executing various kinds of functions by installing various kinds of programs for instance.

[Configuration Example of Computer]

Figure 6:
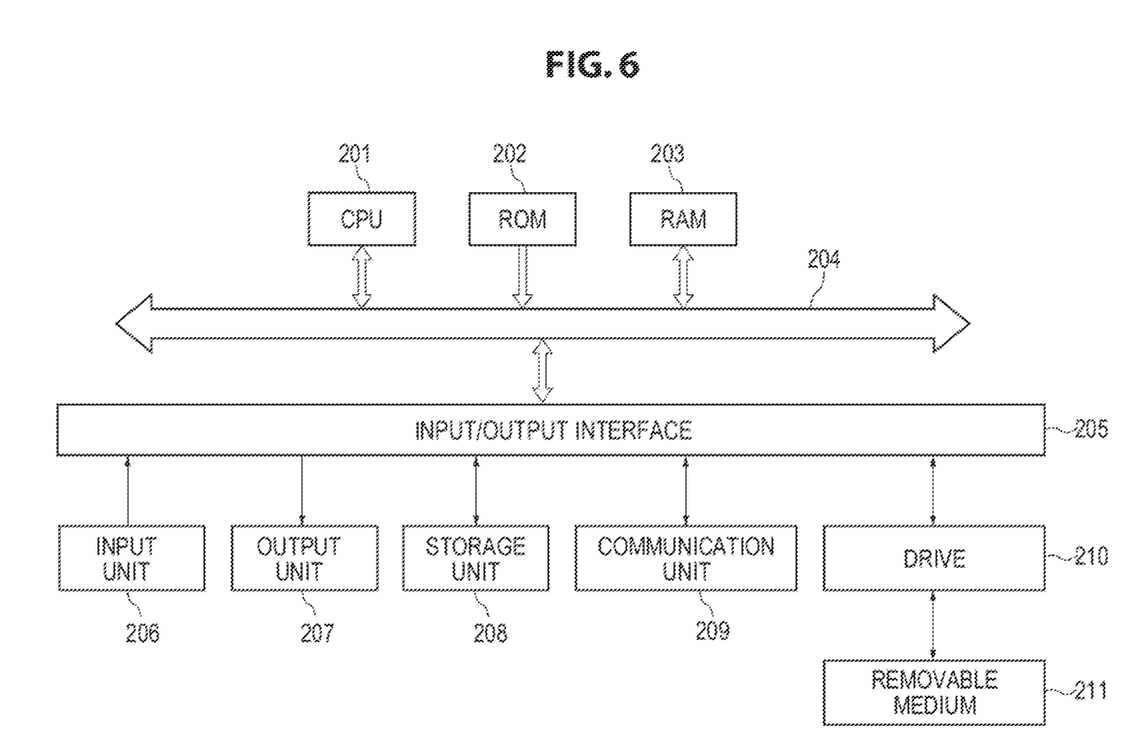
FIG. 6 is a block diagram illustrating a configuration example of hardware of a computer.

FIG. 6 illustrates a configuration example of hardware of a computer that executes the above series of processes by programs.

A central processing unit (CPU) 201 executes various kinds of processing according to the programs stored in a read only memory (ROM) 202 or a storage unit 208. The random access memory (RAM) 203 appropriately stores the programs executed by the CPU 201, data, and the like. The CPU 201, the ROM 202, and the RAM 203 are connected to each other through a bus 204.

In addition, an input/output interface 205 is connected to the CPU 201 through the bus 204. An input unit 206 including a keyboard, a mouse, a microphone, and the like and an output unit 207 including a display, a speaker, and the like are connected to the input/output interface 205. The CPU 201 executes the various kinds of processing according to instructions input from the input unit 206. Then, the CPU 201 outputs the processing result to the output unit 207.

The storage unit 208 connected to the input/output interface 205 includes, for example, a hard disk, and stores the programs to be executed by the CPU 201 and various kinds of data. A communication unit 209 communicates with an external apparatus through a network such as the Internet or a local area network.

In addition, the programs may be acquired through the communication unit 209 and stored in the storage unit 208.

When a removable medium 211 such as a magnetic disk, an optical disk, a magnetic-optical disk, or a semiconductor memory is loaded, a drive 210 connected to the input/output interface 205 drives the removable medium 211 and acquires programs, data, and the like stored in the removable medium 211. The acquired programs and data are transferred to the storage unit 208 as necessary, and are stored in the storage unit 208.

The recording medium that records (stores) the program to be installed in the computer and made executable by the computer includes the removable medium 211 which is a package medium including a magnetic disk (including a flexible disk), an optical disk (including a compact disc-read only memory (CD-ROM), and a digital versatile disc (DVD)), a magnetic-optical disk (including a mini-disc (MD)), a semiconductor memory, and the like or the ROM 202 that temporarily or permanently stores the programs or the hard disk configuring the storage unit 208, and the like, as illustrated in FIG. 6. The program is recorded in the recording medium as necessary through the communication unit 209 which is an interface such as a router or a modem, by utilizing a wired or wireless communication medium such as a local area network, the Internet, or digital satellite broadcast.

In the present disclosure, steps describing the above series of processes may include not only the processing performed in a time sequential manner along the description order but also the processing not processed in a time sequential manner but performed in parallel or individually.

Further, an embodiment of the disclosure is not limited to the embodiments described above, and various changes and modifications may be made without departing from the scope of the disclosure.

REFERENCE SIGNS LIST 1 television receiver
21 image processing unit
22 liquid crystal control unit
23 liquid crystal panel
23a temperature sensor
24 microcomputer
25 BL drive unit
26 backlight
27 control unit
28 operation unit
41 APL measurement unit
42 delay control unit
43 signal processing unit
44 BL value calculation unit

The invention claimed is:

1. A display device comprising:
   a first change unit configured to change a transmittance of a liquid crystal panel in synchronization with a first timing;
   a second change unit configured to change brightness of a backlight of the liquid crystal panel in synchronization with a second timing;
   a microcomputer configured to calculate delay time for delaying the second timing relative to the first timing and couple the calculated delay time to a delay control unit, the calculated delay time being calculated based on a time until the transmittance of the liquid crystal panel changes by a predetermined amount at a given response speed and being less than a time for the transmittance of the liquid crystal panel to change by the predetermined amount;
   a backlight value calculation unit configured to generate a backlight data for reducing a lighting amount of a backlight corresponding to an area of low luminance (dark part) in an image and increasing the lighting amount of the backlight corresponding to an area of high luminance (bright part) in the image and output the generated backlight data to the second change unit at the second timing instructed from the delay control unit; and
   the delay control unit configured to:
      make the first change unit change the transmittance of the liquid crystal panel in synchronization with the first timing, and
      make the second change unit change the brightness of the backlight in synchronization with the second timing delayed from the first timing by the calculated delay time.

2. The display device according to claim 1, further comprising:
   a response speed calculation unit configured to calculate the response speed of the liquid crystal panel.

3. The display device according to claim 2, further comprising:
   a temperature measurement unit configured to measure a temperature of the liquid crystal panel,
   wherein the response speed calculation unit is configured to calculate the response speed of the liquid crystal panel based on the measured temperature of the liquid crystal panel.

4. The display device according to claim 1, further comprising:
   a change amount calculation unit configured to calculate the change amount of the transmittance of the liquid crystal panel.

5. The display device according to claim 4, further comprising:
   a brightness measurement unit configured to measure, based on an input image signal, brightness information related to brightness of an image indicated by the image signal,
   wherein the change amount calculation unit is configured to calculate the change amount based on the brightness information.

6. The display device according to claim 1, in which the backlight composes a light emitting diode (LED).

7. The display device according to claim 1, further comprising an operation unit configured to supply operation signals to a control unit according to an operation from the user.

8. The display device according to claim 1, wherein the first timing or the second timing are less than a time at which a partial drive control pulse is turned off by the microcomputer.

9. A display method for a display device including a first change unit configured to change a transmittance of a liquid crystal panel in synchronization with a first timing, and a second change unit configured to change brightness of a backlight of the liquid crystal panel in synchronization with a second timing, the display method being performed by the display device and comprising:
   calculating, using a microcomputer, delay time for delaying the second timing relative to the first timing, the calculated delay time comprising a time less than it takes until the transmittance of the liquid crystal panel changes by a predetermined amount at a given response speed;
   coupling the calculated delay time to a delay control unit;
   generating a backlight data for reducing a lighting amount of a backlight corresponding to an area of low luminance (dark part) of an image area and increasing the lighting amount of the backlight corresponding to an area of high luminance (bright part) of the image area and outputting the generated backlight data to the second change unit at the second timing instructed from the delay control unit; and
   controlling the delay control unit to:
      make the first change unit change the transmittance of the liquid crystal panel in synchronization with the first timing, and
      make the second change unit change the brightness of the backlight in synchronization with the second timing delayed from the first timing by the calculated delay time.

10. A television receiver comprising:
   a first change unit configured to change a transmittance of a liquid crystal panel in synchronization with a first timing;
   a second change unit configured to change brightness of a backlight of the liquid crystal panel in synchronization with a second timing;
   a microcomputer configured to calculate delay time for delaying the second timing relative to the first timing and couple the calculated delay time to a delay control unit, the calculated delay time comprising a time less than it takes until the transmittance of the liquid crystal panel changes by a predetermined amount at a given response speed;

an image processing unit configured to receive image signals by an antenna;

a backlight value calculation unit configured to generate a backlight data for reducing a lighting amount of a backlight corresponding to an area of low luminance (dark part) in an image and increasing the lighting amount of the backlight corresponding to an area of high luminance (bright part) in the image and output the generated backlight data to the second change unit at the second timing instructed from the delay control unit; and the delay control unit configured to make the first change unit change the transmittance of the liquid crystal panel in synchronization with the first timing, and make the second change unit change the brightness of the backlight in synchronization with the second timing delayed from the first timing by the delay time.

11. A display device comprising:

a first change unit configured to change a transmittance of a liquid crystal panel in synchronization with a first timing;

a second change unit configured to change brightness of a backlight of the liquid crystal panel in synchronization with a second timing;

a microcomputer configured to calculate delay time for delaying the second timing relative to the first timing and couple the calculated delay time to a delay control unit, the calculated delay time being calculated based on a time until the transmittance of the liquid crystal panel changes by a predetermined amount at a given response speed and being less than a time for the transmittance of the liquid crystal panel to change by the predetermined amount;

a backlight value calculation unit configured to generate backlight data for reducing a lighting amount of a backlight corresponding to an area of low luminance or dark part in an area of an image and output the generated backlight data to the second change unit at the second timing instructed from the delay control unit; and the delay control unit configured to:
  make the first change unit change the transmittance of the liquid crystal panel in synchronization with the first timing, and
  make the second change unit change the brightness of the backlight in synchronization with the second timing delayed from the first timing by the delay time.

12. A display device comprising:

a first change unit configured to change a transmittance of a liquid crystal panel in synchronization with a first timing;

a second change unit configured to change brightness of a backlight of the liquid crystal panel by a second timing;

a microcomputer configured to calculate the second timing, the second timing being after the first timing and couple the calculated second timing to a control unit, the calculated delay time being calculated such that the calculated delay is less than a time until the transmittance of the liquid crystal panel changes by a predetermined amount at a given response speed;

a backlight value calculation unit configured to generate backlight data for reducing a lighting amount of a backlight corresponding to an area of low luminance or dark part in an image area and increasing the lighting amount of the backlight corresponding to an area of high luminance or bright part in the image area in response to instructions from the control unit; and the control unit configured to cause the first change unit to change the transmittance of the liquid crystal panel in synchronization with the first timing, and to cause the second change unit to change the brightness of the backlight in accordance with the generated backlight data by the second timing.

* * * * *